(12) United States Patent
Logan et al.

(10) Patent No.: US 9,591,510 B2
(45) Date of Patent: Mar. 7, 2017

(54) SYSTEMS AND METHODS TO CREATE MESSAGE TRAFFIC

(71) Applicant: Raytheon Company, Waltham, MA (US)

(72) Inventors: Jeffery Jay Logan, Cuver City, CA (US); William Rudnisky, Los Angeles, CA (US); Michael P. De Rego, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 180 days.

(21) Appl. No.: 14/492,698

(22) Filed: Sep. 22, 2014

(65) Prior Publication Data

US 2016/0088499 A1 Mar. 24, 2016

(51) Int. Cl.
*H04W 28/02* (2009.01)
*H04L 1/00* (2006.01)
*H04L 12/875* (2013.01)
*H04L 12/939* (2013.01)

(52) U.S. Cl.
CPC ........... *H04W 28/0215* (2013.01); *H04L 1/00* (2013.01); *H04L 47/56* (2013.01); *H04L 49/555* (2013.01)

(58) Field of Classification Search
CPC .... H04W 28/0215; H04L 49/555; H04L 1/00; H04L 47/56
See application file for complete search history.

(56) References Cited

U.S. PATENT DOCUMENTS

| | | | |
|---|---|---|---|
| 7,743,281 B2 | 6/2010 | Conger et al. | |
| 8,305,902 B2 | 11/2012 | Beckmann et al. | |
| 8,463,860 B1 | 6/2013 | Guruswamy et al. | |
| 8,510,823 B2 | 8/2013 | Kuckelman et al. | |
| 2008/0130588 A1* | 6/2008 | Jeong | H04W 74/002 370/335 |
| 2010/0296432 A1* | 11/2010 | Mehta | H04B 7/15592 370/315 |
| 2013/0091269 A1* | 4/2013 | Zhang | H04L 49/50 709/224 |
| 2013/0340083 A1 | 12/2013 | Petrica et al. | |
| 2014/0024332 A1* | 1/2014 | Droste | H04L 12/1895 455/404.2 |

(Continued)

FOREIGN PATENT DOCUMENTS

CN 102243608 A 11/2011
EP 1564315 A1 8/2005
(Continued)

*Primary Examiner* — Walter Divito
(74) *Attorney, Agent, or Firm* — Schwegman Lundberg & Woessner, P.A.

(57) ABSTRACT

Generally discussed herein are systems, apparatuses, and methods for creating message traffic. In one or more embodiments, a method can include receiving message characteristics of a plurality of messages to transmit to a device and transmitting, using processing circuitry, the plurality of messages to the device, wherein the plurality of messages are configured to replicate message traffic that includes the received message characteristics. The message characteristics can include a message pattern, a message density (e.g., high burstiness, low burstiness, or consistent traffic density), a message size, a message type, a message inter-arrival time, or other message characteristic.

17 Claims, 5 Drawing Sheets

(56) References Cited

U.S. PATENT DOCUMENTS

2014/0242978 A1* 8/2014 Shuman ................. H04W 4/10
                                                  455/423

FOREIGN PATENT DOCUMENTS

| WO | WO-01/45370    | A1 | 6/2001  |
| WO | WO-01/49908    | A2 | 7/2001  |
| WO | WO-02/085052   | A1 | 10/2002 |
| WO | WO-2006/110997 | A1 | 10/2006 |
| WO | WO-2010/069587 | A1 | 6/2010  |

* cited by examiner

SYSTEMS AND METHODS TO CREATE MESSAGE TRAFFIC

TECHNICAL FIELD

Embodiments discussed herein generally relate to producing or transmitting messages based on one or more received or determined message traffic characteristics.

BACKGROUND

Traditionally, a device that is capable of communicating with another device is tested by sending individual messages from/to the device. These tests can help ensure the messages are acquired, transmitted, or handled by the devices. In many instances, a device is finalized and deployed before testing the communications capability of the device.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to apparatuses, systems, and methods which produce or transmit messages based on one or more message traffic characteristics.

Subject matter discussed herein can produce message traffic (e.g., can produce realistic message traffic that is configured to replicate message traffic actually received at a device), such as to test a device. Single messages do not test the complete realm of pattern induced failures, throughput limitations, or actual device performance and capabilities. Producing realistic message traffic can help better understand a device's performance characteristics and specifications.

Current Cross-Domain Solution (CDS) or other communication device accreditation is a relatively slow process. The accreditation can be slow due to identifying system specifications, gaining customer approval, rule generation, or implementing the design, among others. An ability to create message traffic that fits one or more message traffic characteristics can help speed up the accreditation process.

A typical communication test platform uses a non-stateful fuzzer to send single messages across a wire. The typical communication test platforms do not send actual messages with realistic message trends when testing a device. Some communication testing is done using beta tests, where actual users test connections, such as after a device has been built but before the device is put on the market. Some communication testing is done after the device and a corresponding communication medium and protocol have been fully developed (but not tested).

In one or more embodiments, a module or device can capture one or more characteristics of message traffic sent across a communication medium. A device can reproduce message traffic that is consistent with (e.g., includes or has characteristics statistically similar to) the characteristics, such as can be used for device testing. The characteristics can include a message inter-arrival time, a throughput characteristic, a message size, a message type, a message order, or a message frequency, among others. Pattern recognition can be used to help replicate the message characteristic. The traffic created can be a statistically accurate replication of the message traffic, such as to provide an accurate replication of the message traffic. In one or more embodiments the traffic can be the same as the message traffic captured.

The produced "stateful" message traffic can be used test a CDS or other hardware or software that communicates, such as over a network. The trends can include predictable (e.g., statistically predictable) message traffic trends. A user can input a message traffic characteristic, or the characteristic can be determined by analyzing actual message traffic, or a combination thereof. In one or more embodiments, the subject matter discussed can work as an add-on to subject matter of U.S. Pat. No. 8,510,823, which is incorporated herein by reference in its entirety.

Subject matter discussed herein can provide an ability to test a device for erroneous functionality due to message order, type, frequency, throughput, or other fault. This ability can provide a medium to test a system before deployment or reduce issues regarding functionality after deployment. The subject matter can be utilized to test hardware and software while reproducing a Concept of Employment (CONEMP) or a Concept of Operation (CONOP).

An embodiment discussed herein can provide an ability to rapidly study communication/security aspects of a target system or device, prototype a communication/security solution, test a communication/security solution extensively or exhaustively, describe a communication/security solution to a customer, readily generate an artifact, or conduct an early communication/security demonstration for a customer, among other uses.

An embodiment discussed herein can provide an ability to identify potential flaws with an existing or future networked system due to message order, type, size, or throughput, reproduce message traffic that induced invalid behavior, such as can be useful for a system or device upgrade, predict a system targeted environment and reproduce it prior to connecting the system in deployment, or test software or hardware components given an capability description or expected message information.

Reference will now be made to the FIGS. to describe further details of one or more embodiments.

Figure 1:
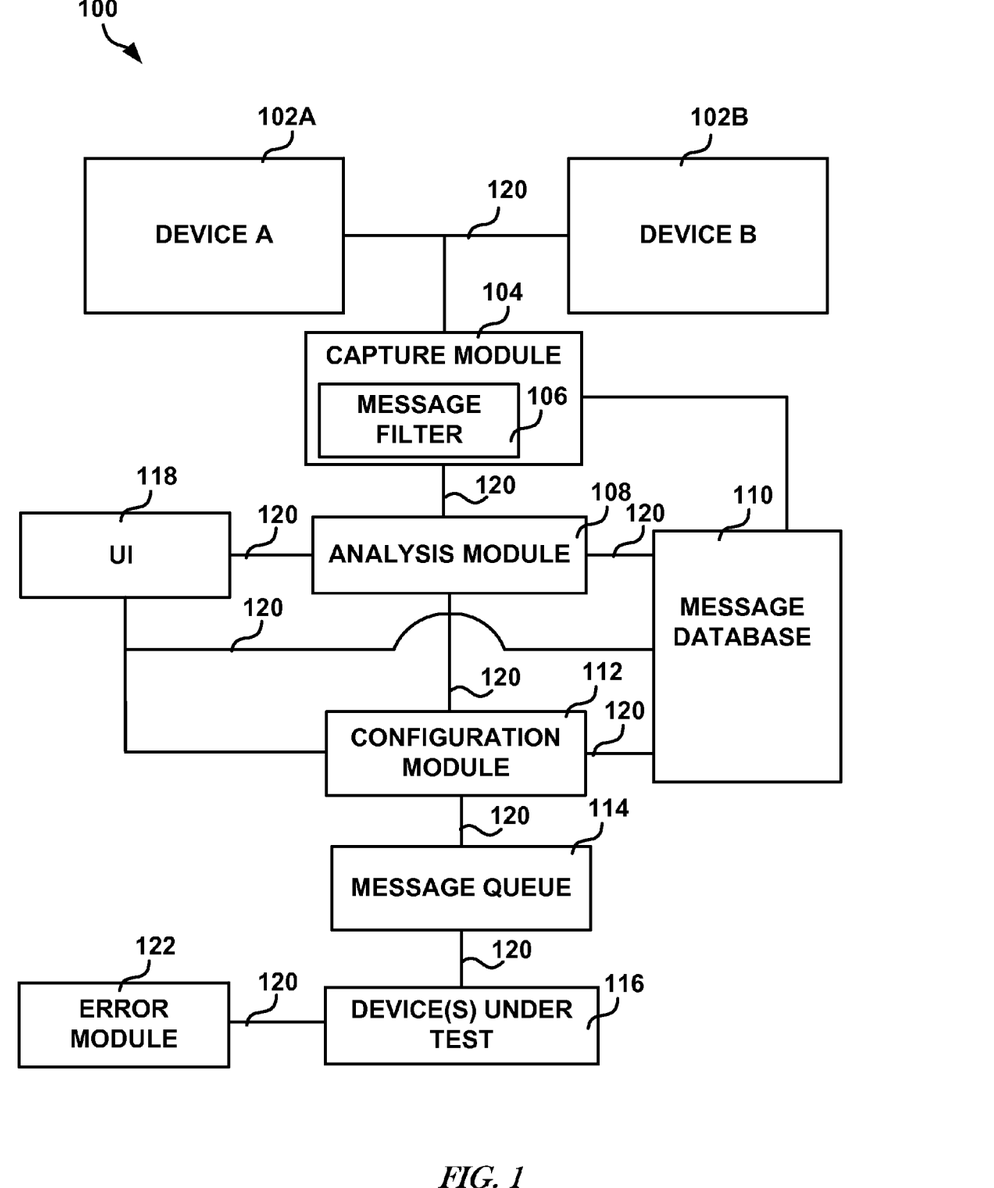
FIG. 1 shows a block diagram of an example of a message traffic analysis system, in accord with one or more embodiments.
Figure 2:
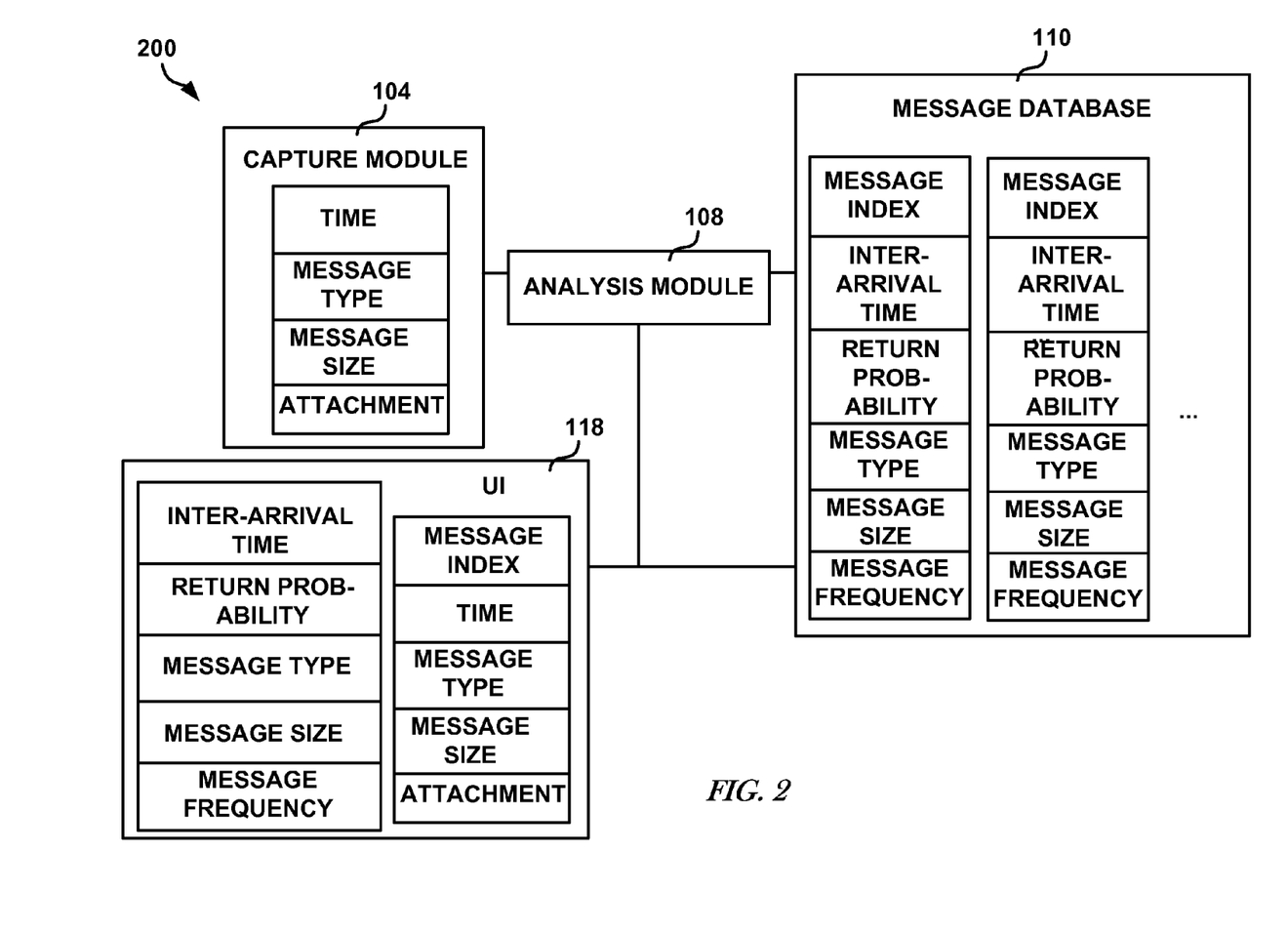
FIG. 2 shows a block diagram of a more detailed view of a portion of a message traffic analysis system, in accord with one or more embodiments.

FIG. 1 illustrates a block diagram of an example of a message traffic creation system 100, in accord with one or more embodiments. FIG. 2 illustrates a more detailed block diagram 200 of a capture module 104, an analysis module 108, a database 110, and a User Interface (UI) 118 in accord with one or more embodiments. The system 100 can include one or more devices 102A or 102B, a capture module 104, an analysis module 108, a message database 110, a configuration module 112, a message queue 114, a Device Under Test (DUT) 116, a UI 118, or an error module 122.

The device 102A-B can include a device that communicates with another device, such as through the connection 120. The connection 120 can include a wired or wireless connection. The communication between the device 102A-B can include a packet, stream, or other message communication. In one or more embodiments, the communication between the device 102A-B can include a Transmission Control Protocol or Internet Protocol (TCP/IP), Simple Mail Transfer Protocol (SMTP), File Transfer Protocol (FTP), User Datagram Protocol (UDP), Internet Control Message Protocol (ICMP), Hypertext Transfer Protocol (HTTP), Internet Message Access Protocol (IMAP), General Inter-ORB Protocol (IIOP), Java Remote Method Invocation (RMI), Distributed Component Object Model (DCOM), Dynamic Data Exchange (DDE), or Simple Object Access Protocol (SOAP), among others.

The capture module 104 can record one or more characteristics regarding communication between the devices 102A-B. The capture module 104 can record a message type (e.g., whether the message is an email, a control packet, a request packet, a stream, or other message type), a time the message was communicated, the origin or destination of the message, the size of the message, whether the message includes an attachment, details about the attachment (e.g., type, size, or the like of the attachment), or other characteristic. The capture module 104 can include a message filter 106. The message filter 106 can provide the ability to record details about selected message types, sizes, or other characteristic(s) only. For example, the message filter 106 can cause the capture module 104 to record only control packet traffic, email traffic, request packet traffic, or a combination thereof. The message filter 106 can be modified through the UI 118, which can provide a user the ability to select the message types the capture module 104 is to monitor. The message filter 106 can include an option to monitor all message traffic between the devices 102A-B. A message type can be determined by looking for a specific bit pattern in a message. The message type can be included in metadata of the message, a header, or the body of the message. For example, a message type in an Internet Protocol network, a message type can be in bytes one through three of a message. By decoding the bytes or using a lookup table, a message type can be determined.

The analysis module 108 can receive the characteristics recorded by the capture module 104. The analysis module 108 can determine further characteristics of the message traffic based on the characteristics received from the capture module 104. The analysis module 108 can determine an inter-arrival time (e.g., an average inter-arrival time, a standard deviation or variance of the inter-arrival time, or other statistic) between messages (e.g., all messages, messages of a specified type(s), messages within a specified size range, a combination thereof, or the like), an average message size (e.g., of all messages, messages of a specified type, messages within a specified size range, a combination thereof, or the like), a message size standard deviation or variance, or a combination thereof, among others. A message frequency can be determined by the analysis module 108, such as can be based on a determined inter-arrival time.

The analysis module 108 can determine or choose a return probability of a message category. A message category can include a message set with a specified characteristic(s). Each message category can be stored in the database 110 using a different message index, such as shown in FIG. 2. The return probability can be a number (e.g., a set of numbers) that indicates a probability that the next message is to include the characteristics of a message in that category. More details regarding the return probability are described with regard to FIG. 3.

The analysis module 108 can record determined or received characteristics in the message database 110. The analysis module 108 can communicate determined or received characteristics to the configuration module 112.

The message database 110 can store details regarding message characteristics, such as by message index as shown in FIG. 2. Each message index can correspond to a message category.

The configuration module 112 can receive message characteristics and create messages consistent with the message characteristics. The configuration module 112 can communicate the created messages to the message queue 114. The configuration module 112 can indicate a time to transmit the message to the DUT 116. The time to transmit the message can include a delta time frame in which to transmit the message or a specific time to transmit the message. The configuration module 112 can retrieve a message from message database 110, such as can be based on a received message index.

The message queue 114 can store (temporarily) messages from the configuration module 112 and transmit the messages to one or more DUTs 116. The DUT 116 can include the device 102A-B or other device.

The UI 118 can provide the ability to manually enter a message characteristic, such as a characteristic captured by the capture module 104 or determined by the analysis module 108. The UI 118 can provide the ability to manually enter a message time, size, type, attachment (details regarding the attachment), among others, such as can be stored by the message database 110 or used by the message queue 114. The UI 118 can provide the ability to create a message category in the database 110. A user can input a message time, origin, destination, type, size (e.g., average, standard deviation, variance, or other size statistic), inter-arrival time (e.g., average, standard deviation, variance, other inter-arrival statistic), frequency (e.g., average, standard deviation, variance, or other frequency statistic), return probability, attachment (e.g., size, type, or other attachment characteristic) or other message characteristic through the UI 118.

The error module 122 can monitor the DUT 116 for an operating error, such as can be caused by messages to/from the DUT 116. The error module 122 can record the message characteristics of the message that caused the error or the actual message that caused the error. The error module 122 can record the characteristics of actual message of one or more messages immediately before the message that caused the error. This information can be useful for determining pattern or characteristic induced failure(s) of the DUT 116. The information can be reported to a user, such as by sending a text, email, alert, or other communication to the user.

Figure 3:
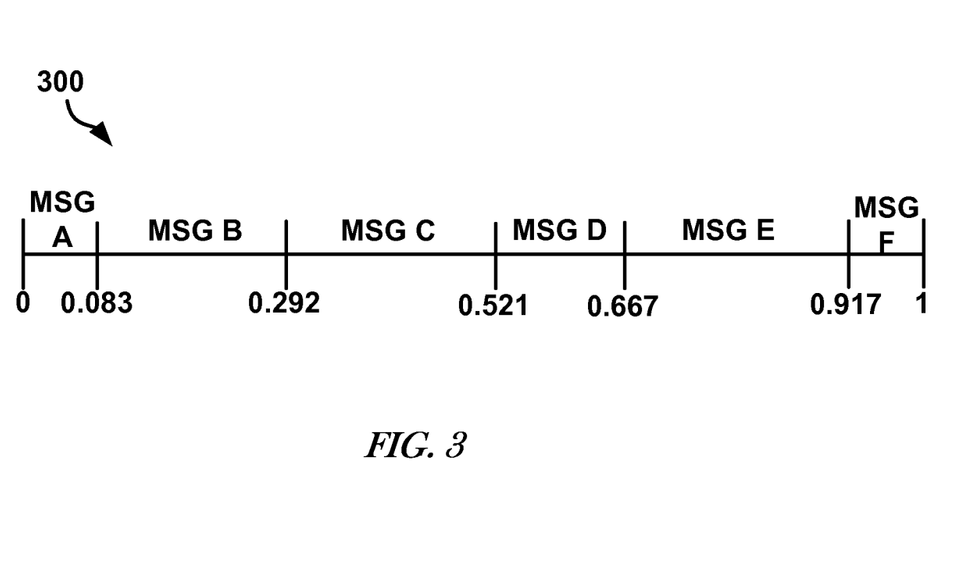
FIG. 3 shows a block diagram of an example of a normalized probability line, in accord with one or more embodiments.

FIG. 3 illustrates an example of a normalized probability line 300, in accord with one or more embodiments. The messages and their number of occurrences or rate to be used in the transmitted messages queue can be determined, such as by using the analysis module 108 or the UI 118. The messages can be organized (e.g., in a random order), conceptually on a number line in accord with a normalized number of occurrences of the message type. A normalized average number of occurrences of each message type can be determined (e.g., by taking the total number of messages of a given type or index and dividing by a total number of messages to be transmitted). The normalized averages can be ordered so that each message takes up an amount of the line that corresponds to the normalized average number of occurrences. Then the return probability can be used to determine which message type or index is placed in the queue next. The return probability can include a seed number that can be used to generate a number (e.g., a random number) in the normalized range (e.g., a number between zero and one). For example, assume the message queue 114 has stored a message with a return probability field of 0.053 as its last entry. This number can be used in a random number generator to determine a random number. The random number produced can be normalized (if necessary) and used to determine which message index will be the next message type added to the queue. In the example of FIG. 3, if the random number produced based on the return probability is 0.50, then a message conforming to the characteristics of message index "MSG C" can be created and stored next in the message queue 114. The process can be repeated to determine the next message in the message queue 114.

The size and time the messages are transmitted can be determined using a random or semi-random process to determine the time or the size. In one or more embodiments, message size or inter-arrival time can be modelled using a statistical distribution. The inter-arrival time or size can be determined using a real number statistical distribution, such as a Gaussian distribution, or a Cauchy distribution. A random number can be generated based on the distribution to help determine the time to transmit the message or the size of the message that will be placed in the queue. In one or more embodiments, the message size, inter-arrival time, or the next message in the queue can be determined by a user or by another non-random or non-statistical process. For example, the message size can be the size of a previous message received of the same message type or an average size of messages of the same type, the time to communicate a message can be based on the inter-arrival time of the last message of that same type or an average inter-arrival time of messages of the same type, or others.

Figure 4:
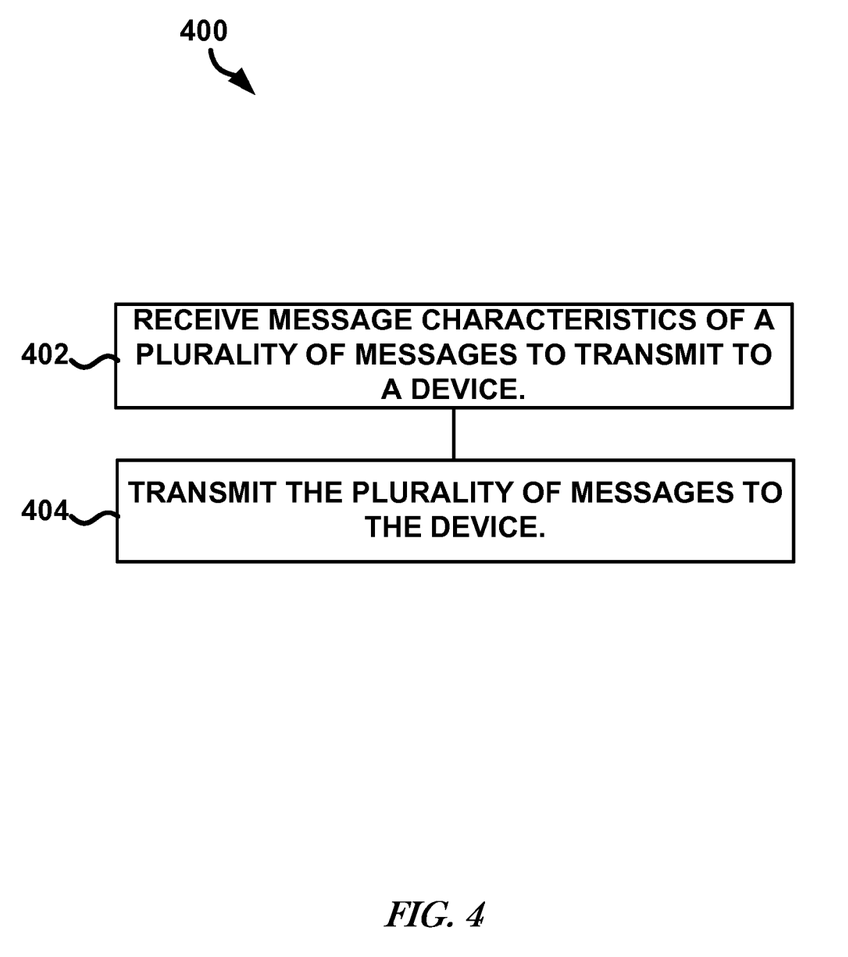
FIG. 4 shows a block diagram of an example of a method, in accord with one or more embodiments.

FIG. 4 illustrates a flow diagram of a method 400, in accord with one or more embodiments. The method 400 as illustrated includes: receiving message characteristics of a plurality of messages to transmit to a device, at operation 402; and, transmitting the plurality of messages to the device, at operation 404. The plurality of transmitted messages can be configured to replicate message traffic that includes the received message characteristics. The message characteristics include at least one of a message inter-arrival time, a throughput characteristic of the device, a message size characteristic, a message type, a message order, message burstiness, or a combination thereof.

The method 400 can include determining characteristics of message traffic to another device. The operation at 402 can include receiving message characteristics based on the determined characteristics of message traffic. The message characteristics can include message characteristics input by a user. The method 400 can include determining whether an error in the device has occurred using the transmitted messages. The method 400 can include reporting an error has occurred in response to determining the error has occurred including reporting the message characteristics of the messages transmitted to the device.

The method can include determining a next message of the plurality of messages to transmit based on a random number (e.g., a return probability) associated with the message. The method 400 can include determining a size of the next message based on a size statistic (e.g., an average size, a size standard deviation, or a size variance, among others) associated with a size characteristic of the next message. In one or more embodiments, the size can be determined by choosing a random size from a Gaussian distribution with the size statistic(s). The random size determined can be rounded or absolute valued to make the random size a positive whole number. In one or more embodiments, the size can be determined by choosing a random size from a Cauchy distribution, such as without the size statistic.

The method 400 can include determining a time to transmit the next message based on an inter-arrival statistic (e.g., an average inter-arrival time, an inter-arrival standard deviation, or an inter-arrival variance, among others) associated with an inter-arrival characteristic of the next message. In one or more embodiments, the time can be determined by choosing a random inter-arrival time from a Gaussian distribution with the inter-arrival statistic(s). In one or more embodiments, the size can be determined by choosing a random inter-arrival time from a Cauchy distribution, such as without the inter-arrival statistic.

Figure 5:
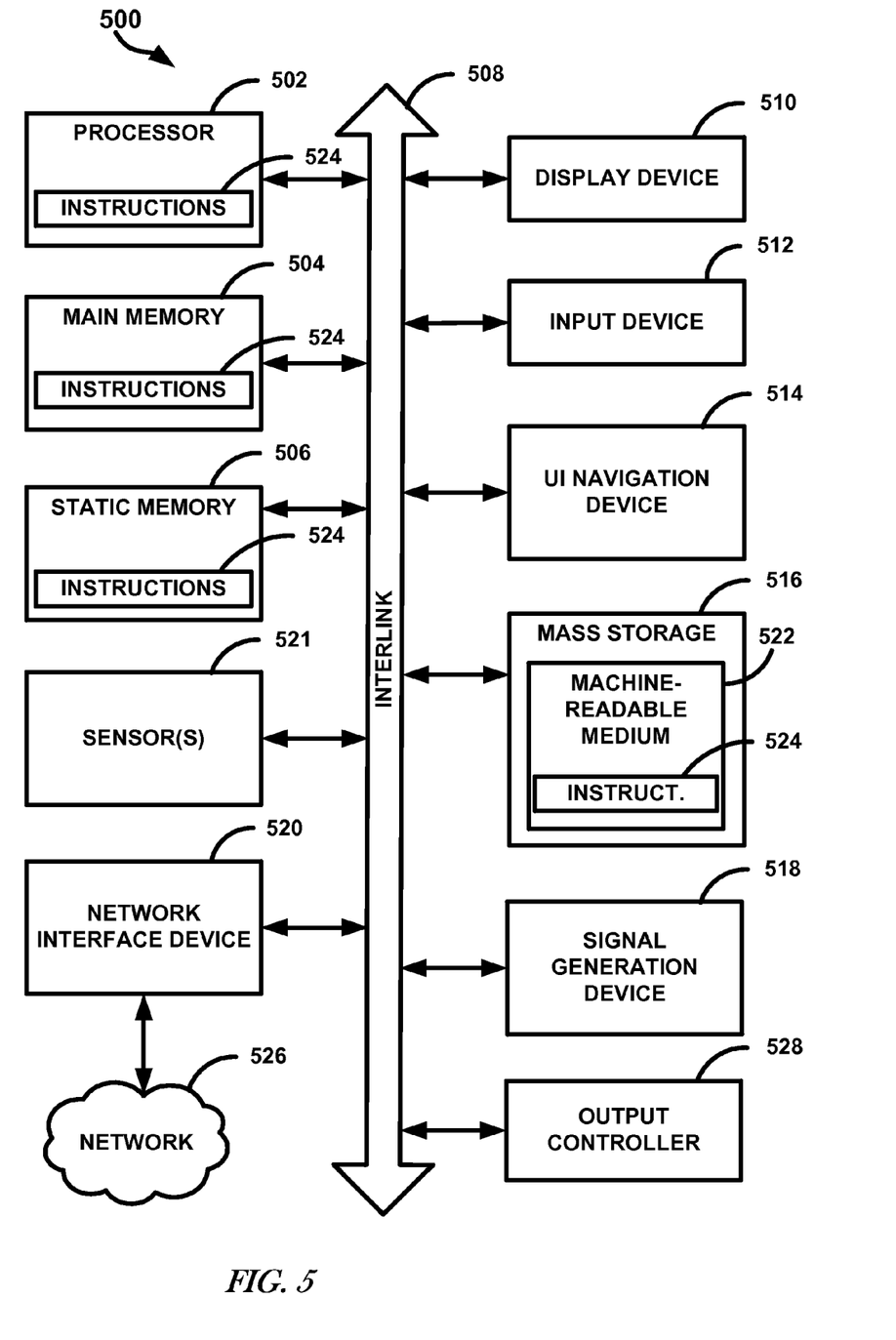
FIG. 5 shows a block diagram of an example of a machine upon which one or more processes or operations (e.g., methods) discussed herein can be performed.

FIG. 5 illustrates a block diagram of a machine 500 upon which any one or more of the process (e.g., methodologies) discussed herein can perform. In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 500 can include a hardware processor 502 (e.g., a central processing unit (CPU), a graphics processing unit (GPU), a hardware processor core, or any combination thereof), a main memory 504 and a static memory 506, some or all of which can communicate with each other via an interlink (e.g., bus) 508. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 can include a machine readable medium 522 on which is stored one or more sets of data structures or instructions 524 (e.g., software) embodying or utilized by any one or more of the process or functions described herein. The instructions 524 can also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 can constitute machine readable media.

While the machine readable medium 522 is illustrated as a single medium, the term "machine readable medium" can include a single medium or multiple media (e.g., a centralized or distributed database, and/or associated caches and servers) configured to store the one or more instructions 524.

The term "machine readable medium" can include any medium that is capable of storing, encoding, or carrying instructions for execution by the machine 500 and that cause the machine 500 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

EXAMPLES AND NOTES

The present subject matter can be described by way of several examples.

Example 1 can include or use subject matter (such as an apparatus, a method, a means for performing operations, or a machine readable memory including instructions that, when performed by the machine, can configure the machine to perform acts), such as can include or use receiving, at processing circuitry, message characteristics of a plurality of messages to transmit to a device, and transmitting the plurality of messages to the device, wherein the plurality of messages are configured by the processing circuitry to replicate message traffic that includes the received message characteristics.

Example 2 can include or use, or can optionally be combined with the subject matter of Example 1, to include or use, wherein the message characteristics include at least one of a message inter-arrival time, a throughput characteristic of the device, a message size, a message type, a message order, a message burstiness, or a combination thereof.

Example 3 can include or use, or can optionally be combined with the subject matter of at least one of Examples 1-2, to include or use determining characteristics of message traffic to another device, and wherein receiving message characteristics includes receiving the determined characteristics of the message traffic to the another device.

Example 4 can include or use, or can optionally be combined with the subject matter of at least one of Examples 1-3, to include or use, wherein the received message characteristics include message characteristics input by a user.

Example 5 can include or use, or can optionally be combined with the subject matter of at least one of Examples 1-4, to include or use, determining whether an error in the device has occurred using the transmitted messages.

Example 6 can include or use, or can optionally be combined with the subject matter of Example 5, to include or use reporting an error has occurred in response to determining the error has occurred including reporting the message characteristics of the messages transmitted to the device.

Example 7 can include or use, or can optionally be combined with the subject matter of at least one of Examples 1-6, to include or use determining a next message of the plurality of messages to transmit based on a random number associated with the message.

Example 8 can include or use, or can optionally be combined with the subject matter of at least one of Examples 1-7, to include or use determining a size of the next message based on a size statistic associated with a size characteristic of the message characteristics of the next message.

Example 9 can include or use, or can optionally be combined with the subject matter of at least one of Examples 1-8, to include or use determining a time to transmit the next message based on an inter-arrival statistic associated with an inter-arrival characteristic of the message characteristics of the next message.

Example 10 can include or use subject matter (such as an apparatus, a method, a means for performing operations, or a machine readable memory including instructions that, when performed by the machine, can cause the machine to perform operations), such as can include or use an analysis module executable by processing circuitry to determine characteristics of a plurality of messages to transmit to a device under test, a configuration module coupled to the analysis module to configure a message of the plurality of messages based on the message characteristics, or a message queue coupled to the configuration module to transmit the configured message to the device under test.

Example 11 can include or use, or can optionally be combined with the subject matter of Examples 10, to include or use, wherein the message characteristics include at least one of a message inter-arrival time, a throughput characteristic of the device under test, a message size, a message type, a message order, a message burstiness, or a combination thereof.

Example 12 can include or use, or can optionally be combined with the subject matter of at least one of Examples 10-11, to include or use a capture module coupled to the analysis module, the capture module to determine characteristics of message traffic to another device and transmit the determined characteristics to the analysis module, and wherein the analysis module to determine characteristics of the plurality of messages includes the analysis module to determine the characteristics based on determined characteristics received from the capture module.

Example 13 can include or use, or can optionally be combined with the subject matter of at least one of Examples 10-12, to include or use an error module coupled to the device under test, the error module to determine whether an error in the device under test has occurred using the transmitted messages.

Example 14 can include or use, or can optionally be combined with the subject matter of Example 13, to include or use, wherein the error module is to report an error has occurred in response to determining the error has occurred including reporting the message characteristics of the messages transmitted to the device under test.

Example 15 can include or use, or can optionally be combined with the subject matter of at least one of Examples 10-14, to include or use, wherein the configuration module is to determine a next message of the plurality of messages to transmit based on a random number associated with the message.

Example 16 can include or use, or can optionally be combined with the subject matter of at least one of Examples 10-15, to include or use, wherein the configuration module is to determine a size of the next message based on a size statistic associated with a size characteristic of the message characteristics of the next message.

Example 17 can include or use, or can optionally be combined with the subject matter of at least one of Examples 10-16, to include or use wherein the configuration module is to determine a time to transmit the next message based on an inter-arrival statistic associated with an inter-arrival characteristic of the message characteristics of the next message.

Example 18 can include or use, or can optionally be combined with the subject matter of at least one of Examples 10-17, to include or use a user interface coupled to the analysis module or the configuration module, the user interface operable to receive the message characteristics, size statistic, or inter-arrival statistic input thereto and transmit the received message characteristics, size statistic, or inter-arrival statistic to the analysis module or the configuration module.

Example 19 can include or use subject matter (such as an apparatus, a method, a means for performing operations, or a machine readable memory including instructions that, when performed by a machine, can configure the machine to perform operations), such as can include or use receiving message characteristics of a plurality of messages to transmit to a device, or transmit the plurality of messages to the device, wherein the plurality of messages are configured to replicate message traffic that includes the received message characteristics.

Example 20 can include or use, or can optionally be combined with the subject matter of Example 19, to include or use, wherein the message characteristics include at least one of a message inter-arrival time, a throughput characteristic of the device, a message size, a message type, a message order, a message burstiness, or a combination thereof.

Example 21 can include or use, or can optionally be combined with the subject matter of at least one of Examples 19-20, to include or use determining characteristics of message traffic to another device, and wherein the instructions for receiving message characteristics include instructions, which when executed by the machine, configure the machine to receive message characteristics based on the determined characteristics of message traffic.

Example 22 can include or use, or can optionally be combined with the subject matter of at least one of Examples 19-21, to include or use, wherein the instructions for receiving message characteristics include instructions, which when executed by the machine, configure the machine to receive message characteristics input using a user interface.

Example 23 can include or use, or can optionally be combined with the subject matter of at least one of Examples 19-22, to include or use instructions, which when executed by the machine, configure the machine to determine whether an error in the device has occurred using the transmitted messages.

Example 24 can include or use, or can optionally be combined with the subject matter of at least one of Examples 19-23, to include or use instructions when executed by the machine, configure the machine to determine a next message of the plurality of messages to transmit based on a random number associated with the message.

Example 25 can include or use, or can optionally be combined with the subject matter of at least one of Examples 19-24, to include or use instructions when executed by the machine, configure the machine to determine a size of the next message based on a size statistic associated with a size characteristic of the message characteristics of the next message.

Example 26 can include or use, or can optionally be combined with the subject matter of at least one of Examples 19-25, to include or use instructions when executed by the machine, configure the machine to determine a time to transmit the next message based on an inter-arrival statistic associated with an inter-arrival characteristic of the message characteristics of the next message.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means or, in the non-exclusive sense discussed in the previous paragraph, of all elements within the range indicated by the dash. For example, 103A-B means a nonexclusive or of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
   receiving, at processing circuitry, first message characteristics of a plurality of messages to transmit to a first device, wherein the first message characteristics include a message inter-arrival time, a message size characteristic, and a message type of actual message traffic transmitted to another device;
   determining first statistics of the first message characteristics including an average of the inter-arrival time, a standard deviation of the inter-arrival time, an average of the message size, a standard deviation of the message size, and a number of messages with the message type;
   generating, using the processing circuitry, mock messages that include second message characteristics that are statistically the same as the determined first statistics, the second message characteristics different from the first message characteristics; and
   transmitting the plurality of mock messages to the first device, wherein the plurality of mock messages are configured by the processing circuitry to be different from the plurality of messages.

2. The method of claim 1, further comprising determining characteristics of message traffic to another device, and wherein receiving message characteristics includes receiving the determined characteristics of the message traffic to the another device.

3. The method of claim 1, wherein the received message characteristics include message characteristics input by a user.

4. The method of claim 1, further comprising determining whether an error in the device has occurred using the transmitted messages.

5. The method of claim 4, further comprising reporting an error has occurred in response to determining the error has occurred including reporting the message characteristics of the messages transmitted to the device.

6. The method of claim 1, further comprising:
   determining a next message of the plurality of messages to transmit based on a random number associated with the message;
   determining a size of the next message based on a size statistic associated with a size characteristic of the message characteristics of the next message; and
   determining a time to transmit the next message based on an inter-arrival statistic associated with an inter-arrival characteristic of the message characteristics of the next message.

7. A system comprising:
   processing circuitry;
   an analysis module executable by the processing circuitry to:
      determine first message characteristics of a plurality of messages to transmit to a device under test, wherein the first message characteristics include a message inter-arrival time, a message size characteristic, and a message type of actual message traffic transmitted to another device, and
      determine first statistics of the first message characteristics including an average of the inter-arrival time, a standard deviation of the inter-arrival time, an average of the message size, a standard deviation of the message size, and a number of messages with the message type;

a configuration module executable by the processing circuitry and coupled to the analysis module, the configuration module to generate mock messages that include second message characteristics that are statistically the same as the determined first statistics, the second message characteristics different from the first message characteristics; and a message queue memory coupled to the configuration module to transmit the mock messages to the device under test, wherein the mock messages are different from the plurality of messages;

transmitting the plurality of mock messages to the first device, wherein the plurality of mock messages are configured by the processing circuitry to include the characteristics that are statistically the same as the first statistics of the message characteristics of the actual message traffic with the mock messages being different from the plurality of messages.

8. The system of claim 7, further comprising a capture module coupled to the analysis module, the capture module to determine characteristics of message traffic to another device and transmit the determined characteristics to the analysis module, and wherein the analysis module to determine characteristics of the plurality of messages includes the analysis module to determine the characteristics based on determined characteristics received from the capture module.

9. The system of claim 7, further comprising an error module coupled to the device under test, the error module to determine whether an error in the device under test has occurred using the transmitted messages.

10. The system of claim 9, wherein the error module is to report an error has occurred in response to determining the error has occurred including reporting the message characteristics of the messages transmitted to the device under test.

11. The system of claim 7, wherein the configuration module is to determine a next message of the plurality of messages to transmit based on a random number associated with the message, determine a size of the next message based on a size statistic associated with a size characteristic of the message characteristics of the next message, and determine a time to transmit the next message based on an inter-arrival statistic associated with an inter-arrival characteristic of the message characteristics of the next message.

12. The system of claim 11, further comprising a user interface coupled to the analysis module or the configuration module, the user interface operable to receive the message characteristics, size statistic, or inter-arrival statistic input thereto and transmit the received message characteristics, size statistic, or inter-arrival statistic to the analysis module or the configuration module.

13. A non-transitory computer readable storage device including instructions stored thereon, which when executed by a machine, configure the machine to:

receive first message characteristics of a plurality of messages to transmit to a first device, wherein the first message characteristics include a message inter-arrival time, a message size characteristic, and a message type of actual message traffic transmitted to another device;

determine first statistics of the first message characteristics including an average of the inter-arrival time, a standard deviation of the inter-arrival time, an average of the message size, a standard deviation of the message size, and a number of messages with the message type;

generating, using the processing circuitry, mock messages that include second message characteristics that are statistically the same as the determined first statistics, the second message characteristics different from the first message characteristics; and transmit the plurality of mock messages to the first device, wherein the plurality of mock messages are configured to be different from the plurality of messages.

14. The storage device of claim 13, further comprising instructions, which when executed by the machine, configure the machine to:

determine characteristics of message traffic to another device, and wherein the instructions for receiving message characteristics include instructions, which when executed by the machine, configure the machine to receive the determined characteristics of the message traffic to the another device.

15. The storage device of claim 13, wherein the instructions for receiving message characteristics include instructions, which when executed by the machine, configure the machine to receive message characteristics input using a user interface.

16. The storage device of claim 13, further comprising instructions, which when executed by the machine, configure the machine to determine whether an error in the device has occurred using the transmitted messages.

17. The storage device of claim 13, further comprising instructions when executed by the machine, configure the machine to:

determine a next message of the plurality of messages to transmit based on a random number associated with the message;

determine a size of the next message based on a size statistic associated with a size characteristic of the message characteristics of the next message; and determine a time to transmit the next message based on an inter-arrival statistic associated with an inter-arrival characteristic of the message characteristics of the next message.

* * * * *